US011941658B2

(12) United States Patent
Chaouki et al.

(10) Patent No.: US 11,941,658 B2
(45) Date of Patent: *Mar. 26, 2024

(54) SYSTEMS AND METHODS FOR MEASURING EFFECTIVENESS OF MARKETING AND ADVERTISING CAMPAIGNS

(71) Applicant: Trans Union LLC, Chicago, IL (US)

(72) Inventors: Steven M. Chaouki, Chicago, IL (US); Tammy P. Mitchell, Kenilworth, IL (US); Clifton H. Burns, Geneva, IL (US)

(73) Assignee: TRANS UNION LLC, Chicago, IL (US)

( * ) Notice: Subject to any disclaimer, the term of this patent is extended or adjusted under 35 U.S.C. 154(b) by 134 days.

This patent is subject to a terminal disclaimer.

(21) Appl. No.: 17/140,931

(22) Filed: Jan. 4, 2021

(65) Prior Publication Data
US 2021/0406948 A1  Dec. 30, 2021

Related U.S. Application Data

(63) Continuation of application No. 14/528,427, filed on Oct. 30, 2014, now Pat. No. 10,885,544.

(Continued)

(51) Int. Cl.
*G06Q 30/00* (2023.01)
*G06Q 30/0242* (2023.01)

(52) U.S. Cl.
CPC .............................. *G06Q 30/0242* (2013.01)

(58) Field of Classification Search
None
See application file for complete search history.

(56) References Cited

U.S. PATENT DOCUMENTS 6,487,538 B1   11/2002   Gupta et al.
7,379,913 B2   5/2008   Steele et al.
(Continued)

FOREIGN PATENT DOCUMENTS

CN   101073094 A   11/2007
CN   102231869 A   11/2011
(Continued)

OTHER PUBLICATIONS

Lewis et al. Measuring the Effects of Advertising: The Digital Frontier. (Oct. 2013). Retrieved online Aug. 31, 2020. https://www.nber.org/papers/w19520.pdf (Year: 2013).*

(Continued)

*Primary Examiner* — James A Reagan
(74) *Attorney, Agent, or Firm* — Sterne, Kessler, Goldstein & Fox P.L.L.C.

(57) ABSTRACT

Systems and methods are disclosed for measuring the effectiveness of a marketing and advertising campaign directed at consumers. The systems and methods receive data corresponding to consumers that were served impressions in the campaign, and match the data to identifiers for credit records of the consumers. Credit record activity information in the credit records related to products and services of the campaign can be retrieved and potentially depersonalized. The credit record activity information can be the basis of a campaign report for adjusting and optimizing the campaign, in the case of an in-flight campaign report, or future campaigns, in the case of a post-campaign report. More accurate measurement of the effectiveness of the campaign can be obtained due to linking of a consumer's activity with the campaign.

20 Claims, 5 Drawing Sheets

Related U.S. Application Data

(60) Provisional application No. 61/897,652, filed on Oct. 30, 2013.

(56) References Cited

U.S. PATENT DOCUMENTS

| | | | |
|---|---|---|---|
| 7,836,093 B2 | 11/2010 | Gobeyn et al. | |
| 7,904,337 B2 | 3/2011 | Morsa | |
| 7,949,565 B1 | 5/2011 | Eldering et al. | |
| 8,340,685 B2* | 12/2012 | Cochran | H04W 4/029 |
| | | | 455/456.1 |
| 8,626,579 B2* | 1/2014 | Fordyce, III | G06Q 30/02 |
| | | | 705/14.1 |
| 8,768,770 B2* | 7/2014 | Kitts | G06Q 30/0241 |
| | | | 705/14.66 |
| 9,152,727 B1 | 10/2015 | Balducci et al. | |
| 9,972,021 B2* | 5/2018 | Yoder | G06Q 30/02 |
| 10,380,617 B2* | 8/2019 | Carlson | G06Q 30/0226 |
| 10,885,544 B2 | 1/2021 | Chaouki et al. | |
| 10,956,924 B2* | 3/2021 | Carlson | G06Q 30/0207 |
| 10,977,666 B2* | 4/2021 | Yoder | G06Q 30/0215 |
| 11,042,897 B2* | 6/2021 | Kitts | G06Q 30/0241 |
| 11,107,116 B2* | 8/2021 | Kitts | G06Q 30/0243 |
| 11,514,473 B2* | 11/2022 | Kitts | G06Q 30/0242 |
| 2003/0131102 A1 | 7/2003 | Umbreit | |
| 2003/0154126 A1 | 8/2003 | Gehlot et al. | |
| 2003/0233357 A1 | 12/2003 | Merenda et al. | |
| 2004/0088255 A1 | 5/2004 | Zielke et al. | |
| 2005/0144073 A1 | 6/2005 | Morrisroe et al. | |
| 2005/0166233 A1 | 7/2005 | Beyda et al. | |
| 2007/0011048 A1* | 1/2007 | Naito | G06Q 30/0255 |
| | | | 705/14.53 |
| 2007/0011224 A1 | 1/2007 | Mena | |
| 2007/0226097 A1 | 9/2007 | Keechle | |
| 2007/0239527 A1 | 10/2007 | Nazer et al. | |
| 2008/0155588 A1 | 6/2008 | Roberts et al. | |
| 2008/0199042 A1 | 8/2008 | Smith | |
| 2008/0208548 A1 | 8/2008 | Metzger et al. | |
| 2008/0281711 A1 | 11/2008 | Bridges et al. | |
| 2008/0288355 A1 | 11/2008 | Rosen | |
| 2009/0024462 A1 | 1/2009 | Lin | |
| 2009/0037257 A1 | 2/2009 | Stuckey et al. | |
| 2009/0055267 A1* | 2/2009 | Roker | G06F 17/3089 |
| | | | 705/14.1 |
| 2009/0063284 A1 | 3/2009 | Turpin et al. | |
| 2009/0119506 A1* | 5/2009 | Allen | H04L 9/08 |
| | | | 713/156 |
| 2009/0129377 A1 | 5/2009 | Chamberlain et al. | |
| 2009/0216642 A1 | 8/2009 | Ho et al. | |
| 2009/0234711 A1* | 9/2009 | Ramer | G06Q 30/0269 |
| | | | 705/14.66 |
| 2010/0106569 A1* | 4/2010 | Grimes | G06Q 30/0269 |
| | | | 705/14.1 |
| 2010/0106596 A1* | 4/2010 | Grimes | G06Q 30/0261 |
| | | | 705/14.51 |
| 2010/0121696 A1 | 5/2010 | Green et al. | |
| 2010/0153383 A1 | 6/2010 | Cohen | |
| 2010/0205261 A1 | 8/2010 | Michel | |
| 2011/0010661 A1 | 1/2011 | Wade et al. | |
| 2011/0035278 A1* | 2/2011 | Fordyce, III | G06Q 30/0267 |
| | | | 705/14.49 |
| 2011/0066705 A1 | 3/2011 | Wilson | |
| 2011/0106610 A1 | 5/2011 | Landis et al. | |
| 2011/0119111 A1 | 5/2011 | Hanna | |
| 2011/0166931 A1 | 7/2011 | Joa et al. | |
| 2011/0218859 A1 | 9/2011 | Wang et al. | |
| 2011/0246267 A1* | 10/2011 | Williams | G06Q 30/02 |
| | | | 705/14.4 |
| 2011/0276374 A1 | 11/2011 | Heiser, II et al. | |
| 2012/0054019 A1* | 3/2012 | Kitts | G06Q 30/0241 |
| | | | 705/14.41 |
| 2012/0054021 A1* | 3/2012 | Kitts | G06Q 30/0243 |
| | | | 705/14.42 |
| 2012/0059702 A1* | 3/2012 | Yoder | G06Q 30/02 |
| | | | 705/14.49 |
| 2012/0124161 A1* | 5/2012 | Tidwell | G06F 21/6254 |
| | | | 709/217 |
| 2012/0150641 A1* | 6/2012 | Dobbs | G06Q 30/02 |
| | | | 705/14.53 |
| 2013/0085869 A1* | 4/2013 | Carlson | G06Q 30/0207 |
| | | | 705/14.72 |
| 2013/0218670 A1* | 8/2013 | Spears | G06Q 30/0248 |
| | | | 705/14.47 |
| 2013/0262226 A1* | 10/2013 | LaChapelle | G06Q 30/0269 |
| | | | 705/14.53 |
| 2013/0290167 A1 | 10/2013 | Laky et al. | |
| 2014/0032304 A1* | 1/2014 | Kent | G06Q 30/02 |
| | | | 705/14.43 |
| 2014/0108130 A1* | 4/2014 | Vos | G06Q 30/0246 |
| | | | 705/14.45 |
| 2014/0316883 A1* | 10/2014 | Kitts | G06Q 30/0241 |
| | | | 705/14.45 |
| 2018/0247319 A1* | 8/2018 | Yoder | G06Q 30/0215 |
| 2019/0325469 A1* | 10/2019 | Carlson | G06Q 30/0207 |
| 2021/0233093 A1* | 7/2021 | Yoder | G06Q 30/0215 |
| 2021/0256555 A1* | 8/2021 | Kitts | G06Q 30/0243 |
| 2021/0357976 A1* | 11/2021 | Kitts | G06Q 30/0246 |

FOREIGN PATENT DOCUMENTS

| | | | | |
|---|---|---|---|---|
| JP | 2004046715 A | * | 2/2004 | G06F 17/60 |
| JP | 2005128853 A | | 5/2005 | |
| KR | 100637332 B1 | | 10/2006 | |
| KR | 20090000221 A | | 1/2009 | |
| KR | 20100062524 A | | 6/2010 | |
| KR | 20130062431 A | | 6/2013 | |
| WO | WO-0137183 A1 | * | 5/2001 | G06Q 30/02 |
| WO | WO-2005013092 A2 | | 2/2005 | |
| WO | WO-2008109608 A1 | * | 9/2008 | G06Q 30/02 |
| WO | WO-2013148356 A1 | | 10/2013 | |

OTHER PUBLICATIONS comscore.com. Comscore Launches Audience Advantage™ Predictive Modeling Platform to Help Publishers Optimize Audiences for Digital Ad Campaigns Campaign Planning Tool Reduces Waste, Delivering Efficiency and Effectiveness for Advertisers and Higher CPMs for Publishers. (Feb. 22, 2010). (Year: 2010).*

Experian. Explaining Experian. (Nov. 2006). Retrieved online Aug. 31, 2020. https://www.experianplc.com/media/1222/explainexpnov06.pdf (Year: 2006).*

International Search Report and Written Opinion Issued in Corresponding PCT Patent Application No. PCT/US2013/032484, dated Jun. 28, 2013, 08 pages.

International Search Report and Written Opinion Issued in Corresponding PCT Patent Application No. PCT/US2014/063120, dated Jan. 29, 2015, 08 pages.

International Search Report and Written Opinion Issued in Corresponding PCT Patent Application No. PCT/US2015/019988, dated May 29, 2015, 09 pages.

* cited by examiner

SYSTEMS AND METHODS FOR MEASURING EFFECTIVENESS OF MARKETING AND ADVERTISING CAMPAIGNS

CROSS-REFERENCE TO RELATED APPLICATION

This application is a continuation of U.S. application Ser. No. 14/528,427, which was filed on Oct. 30, 2014, which claims the benefit of U.S. Provisional Patent Application No. 61/897,652 filed on Oct. 30, 2013, which are incorporated herein by reference in its entirety.

TECHNICAL FIELD

This disclosure generally relates to marketing and advertising campaigns, and more particularly, to systems and methods for measuring the effectiveness of marketing and advertising campaigns that are directed at consumers.

BACKGROUND

Campaigns related to the marketing and advertising of products and services may include traditional aspects, such as direct mailings, billboards, etc., and/or digital aspects, such as banner advertisements, point of sale, social targeting, etc. The marketing and advertising campaigns may relate to products and services offered by entities, such as financial institutions, utility companies, telecommunications companies, and cable television companies, to consumers or small businesses, for example. The products and services may include, for example, credit or loans (e.g., credit cards, mortgages, lines of credit, student loans, automobile loans and leases), underlying purchases related to the credit or loans (e.g., purchasing an automobile or home), insurance policies, utility accounts, etc. that apply analytics or data analysis in determining offers and advertisements for these products and services. Measuring the effectiveness of campaigns can help control the direction and configuration of ongoing, in-flight campaigns and of future campaigns. One way that campaign effectiveness can be measured is by measuring responses to the advertisements and offers of the campaign. For example, the effectiveness of a digital marketing and advertising campaign can be measured by the click-through rate of the advertisements that make up the campaign. The click-through rate denotes the percentage of people who have clicked on or interacted with an online advertisement divided by the total number of impressions of the advertisement, i.e., the number of times the advertisement was served. Each impression may be a single exposure to the campaign, such as through a display of an advertisement of the campaign.

However, there are drawbacks to using traditional measurement techniques for measuring the effectiveness of traditional or digital marketing and advertising campaigns. For example, in a digital campaign involving a credit card, an advertisement of the campaign may be served to a person who clicks on the advertisement, but the person may or may not accept the offer related to the credit card. In this situation, the click-through rate may be skewed upward. Other people may have been served and seen the advertisement, but did not click on the advertisement. However, it is possible that this category of people may apply for the credit card through other channels, such as by calling or physically visiting a branch of a financial institution. Although these people were influenced by the campaign, it is difficult to measure the campaign's effectiveness on them because their offline activity is not directly linkable to the campaign. In this situation, the click-through rate may be skewed downward. As such, the click-through rate in this example may be inaccurate and thereby affect the measurement of the campaign's effectiveness.

Therefore, there exists an opportunity for improved systems and methods that can more accurately measure the effectiveness of marketing and advertising campaigns, in order to, among other things, obtain improved and optimized management of the marketing and advertising campaigns.

SUMMARY

The invention is intended to solve the above-noted problems by providing systems and methods for measuring the effectiveness of a marketing and advertising campaign directed at a plurality of consumers. The systems and methods are designed to perform one or more of the following, among other things: (1) receive data corresponding to consumers that were served impressions in a marketing and advertising campaign; (2) match the data to identifiers for credit records of the consumers in a credit data database; (3) retrieve, from the credit record, credit record activity related to the consumers targeted by the campaign; (4) depersonalize the credit record activity information from the credit records; (5) while the campaign is in progress, generate and transmit an in-flight campaign report based on the credit record activity information and/or the depersonalized credit record activity information; and (6) after the campaign is completed, generate and transmit a post-campaign report based on the credit record activity information and/or the depersonalized credit record activity information.

The systems and methods enable improved measurement of the effectiveness of marketing and advertising campaigns by linking impressions of advertisements of the campaigns to activities undertaken by consumers. In particular, the measurement of the effectiveness of marketing and advertising campaigns using these systems and methods is not limited to traditional measurement techniques, such as click-through rate, pixel tracking, landing page activity, tracking numbers, response rates, acceptance rates, etc., but instead can also factor in the activities of consumers in the measurement. For example, the activities may include applying for credit or loans related to the advertisements, expressing interest in an automobile purchase related to the advertisements, and/or activity or a change in the usage of a credit card related to the advertisements. With respect to digital marketing and advertising campaigns, the activities may be through a channel other than clicking through advertisements.

In this way, consumers who have been served advertisements of a campaign but did not directly interact with the advertisements, e.g., by clicking, yet still expressed interest or obtained the products or services related to the campaign, can be considered in determining the campaign's effectiveness. In other words, the effectiveness of the marketing and advertising campaign can be measured more accurately because a consumer's activity can be determined and linked to the advertisements of the campaign that were served to the consumer. The advertisements can be interpreted as the impetus for the consumer to perform the activity, e.g., applying for credit at a bank branch, expressing an interest in purchasing an automobile at a car dealer, etc. While a marketing and advertising campaign is in progress, in-flight campaign reports can be generated based on credit record activity of the consumer that can be linked to the campaign.

This credit record activity may be retrieved while the campaign is in progress. The in-flight campaign reports can be utilized to improve and optimize the campaign. This is contrast to current systems that cannot determine the influence of activities on a campaign while the campaign is in progress. After a marketing and advertising campaign is completed, post-campaign reports can be generated that can be utilized to improve and optimize future campaigns. Such post-campaign reports may be based on credit record activity of the consumer that can be linked to the campaign. This credit record activity may be retrieved after the campaign is completed. The credit record activity may include inquiries, balance changes, tradelines, balances, activations, delinquencies, payments, etc., for example.

In a particular embodiment, data corresponding to a consumer that was served an impression in a marketing and advertising campaign may be received. The data may be matchable to an identifier for identifying a credit record of the consumer in a credit data database. Credit record activity information can be retrieved from the credit record. A campaign report can be generated and transmitted based on the credit record activity information. The campaign report can be an in-flight campaign report, if the campaign is in progress, or a post-campaign report, if the campaign is complete. The credit record activity information can be depersonalized, in some embodiments, so that the campaign report is based on depersonalized credit record activity information.

These and other embodiments, and various permutations and aspects, will become apparent and be more fully understood from the following detailed description and accompanying drawings, which set forth illustrative embodiments that are indicative of the various ways in which the principles of the invention may be employed.

DETAILED DESCRIPTION OF THE INVENTION

Figure 1:
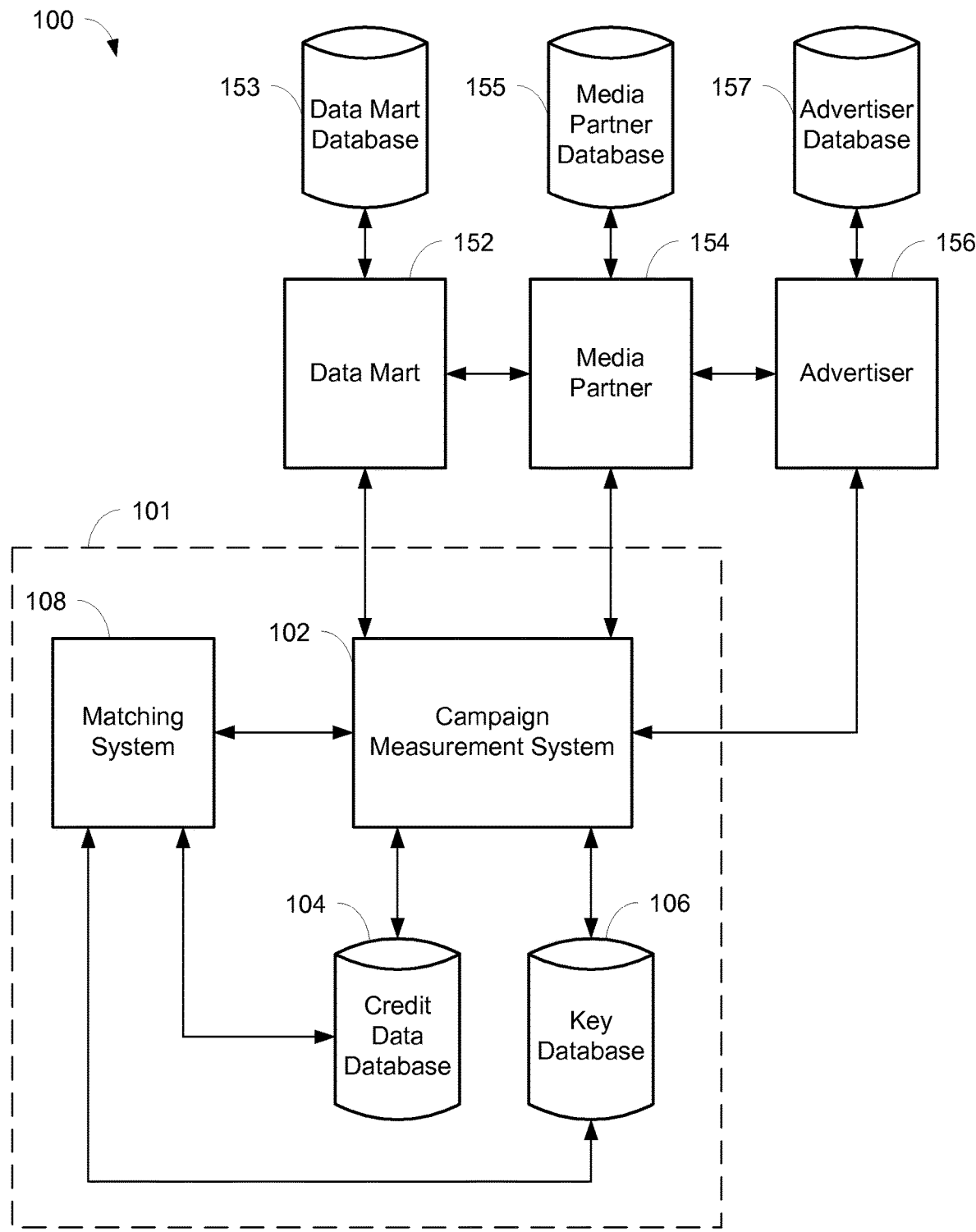
FIG. 1 is a block diagram illustrating an exemplary environment for measuring the effectiveness of a marketing and advertising campaign, including a campaign measurement system.

The description that follows describes, illustrates and exemplifies one or more embodiments in accordance with their principles. This description is not provided to limit the embodiments described herein, but rather to explain and teach the principles of the embodiments in such a way to enable one of ordinary skill in the art to understand these principles and, with that understanding, be able to apply them to practice not only the embodiments described herein, but also other embodiments that may come to mind in accordance with these principles. The scope of the embodiments is/are intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers such as, for example, in cases where such labeling facilitates the didactic purpose of the specification. Additionally, the drawings set forth herein are not necessarily drawn to scale, and in some instances proportions may have been exaggerated to more clearly depict certain features. Such labeling and drawing practices do not necessarily implicate an underlying substantive purpose. As stated above, the present specification is intended to be taken as a whole and interpreted in accordance with the principles of the embodiments as taught herein and understood to one of ordinary skill in the art.

With respect to the exemplary systems, components and architecture described and illustrated herein, it should also be understood that the embodiments may be embodied by, or employed in, numerous configurations and components, including one or more systems, hardware, software, or firmware configurations or components, or any combination thereof, as understood by one of ordinary skill in the art. Accordingly, while the drawings illustrate exemplary systems including components for one or more of the embodiments contemplated herein, it should be understood that with respect to each embodiment, one or more components may not be present or necessary in the system.

It should also be noted that the disclosures made in this specification are in accordance with the principles of the embodiments(s), which are intended to be disclosed or interpreted to their broadest extent under the patent laws, and while such disclosure may describe or otherwise cover subject matter that may be regulated by other existing laws or regulations, including, without limitation, the Fair Credit Reporting Act (FCRA) or the Equal Credit Opportunity Act (ECOA), nothing in this disclosure is intended to suggest or imply noncompliance with any such law or regulation by the assignee.

FIG. 1 illustrates an exemplary environment 100 in which the systems and methods described herein can be implemented. The environment 100 includes a campaign measurement system 102 for measuring the effectiveness of a marketing and advertising campaign directed at a plurality of consumers. The marketing and advertising campaigns can include, for example, traditional marketing and advertising campaigns and/or digital marketing advertising campaigns. Digital marketing advertising campaigns may include, without limitation, serving impressions of advertisements through web browsers, mobile applications, and/or videos on computers, mobile electronic devices, and/or addressable devices (e.g., cable and satellite set-top boxes and/or televisions), for example. The campaigns can be related to any products and services. In some embodiments, the campaign measurement system 102 may be operated by an entity, such as a credit bureau 101, that can access credit-related data in a credit data database 104. The credit-related data may include credit header data, such as identifying information for a plurality of targeted consumers, including names, dates of birth, identification numbers (e.g., social security numbers, national identification numbers, etc.), street addresses, cities, states, zip codes, telephone numbers, account numbers (e.g., credit card account numbers, loan account numbers, etc.), and/or other identifying information. In some embodiments, the credit-related data may include historical data for the identifying information, such as previous addresses, telephone numbers, names, etc. and/or historical data for credit activity, such as balance history, payment history, etc. The credit-related data in the credit data database 104 may be maintained by the credit bureau, for example. In some embodiments, the credit-related data in the credit data database 104 may include data sourced or originated from a credit bureau, a credit reporting agency, and/or another entity. The credit data database 104 may include data available to consumers, proprietary data, and/or other types of data.

The campaign measurement system 102 may utilize data corresponding to consumers who have been served impressions in the marketing and advertising campaign. The data may be matchable to identifiers for identifying credit records of the consumers in the credit data database 104. The data may include, for example, keys received from a data mart 152, a media partner 154, and/or an advertiser 156. The impressions may include the display of advertisements of the marketing and advertising campaign that have been targeted to the consumers. In some embodiments, the consumers may have been targeted based on data gleaned from the online activity of the consumers. The data may be received periodically by the campaign measurement system 102 while the marketing and advertising campaign is in progress, in some embodiments.

In some embodiments, the keys may have been originally assigned and created by a matching system 108 that is in communication with the campaign measurement system 102. The matching system 108 may compare and match offline data and online data with credit-related data to identify matching targeted consumers, for example, and store the keys in a key database 106. Embodiments of a matching system 108 are disclosed in a commonly-assigned non-provisional application filed on Mar. 15, 2013, titled "Systems and Methods for Targeted Internet Marketing Based on Offline, Online, and Credit-Related Data" (U.S. Ser. No. 13/841,022), which is hereby incorporated by reference in its entirety. In other embodiments, the keys may have been generated by other entities.

When the campaign measurement system 102 receives the data corresponding to consumers who have been served impressions in the campaign, the data may be matched by the campaign measurement system 102 to an identifier of the consumer. The identifier may be a unique identifier of a credit record of the consumer in the credit data database 104. Using the identifier, the credit record can be retrieved from the credit data database 104 so that the campaign measurement system 102 can retrieve credit record activity in the credit record. The credit record activity may be related to a product or service being marketed in the marketing and advertising campaign and/or related to the consumers being marketed to by the campaign. The credit record activity may include, for example, inquiries, balance changes, tradelines, balances, activations, delinquencies, payments, etc. Some inquiries may be a consumer database inquiry, such as an FCRA-related inquiry (e.g., credit cards, loans, etc.), a fraud inquiry, an identity management verification, etc. FCRA-related inquiries may include, for example, FCRA consumer report inquiries and GLBA (Gramm-Leach-Bliley Act) fraud and collection report inquiries. The campaign measurement system 102 may also store the matched identifier in a database for later use after the marketing and advertising campaign is completed, in some embodiments.

The credit record activity may be directly or indirectly related to the products or services being marketed in the marketing and advertising campaign. Directly related credit record activity may include activity that is for a product or service that is the subject of the marketing and advertising campaign. The product or service is offered by the advertiser 156 running the marketing and advertising campaign. For example, a consumer may have applied for a credit card of a financial institution that was the subject of an advertisement of the marketing and advertising campaign. As another example, a consumer may have activated the credit card that was the subject of an advertisement of the marketing and advertising campaign.

Indirectly related credit record activity may include activity that is for a product or service that of a type related to the product or service that is the subject of the marketing and advertising campaign. The product or service associated with indirectly related credit record activity is not the product or service that is itself the subject of the campaign, and may be offered by the advertiser 156 running the campaign or may be offered by another entity unrelated to the advertiser 156. For example, a consumer may have applied for a credit card of another financial institution other than the financial institution that is running the marketing and advertising campaign. As another example, a consumer may have applied for a different credit card from the financial institution that is running the marketing and advertising campaign, rather than the specific credit card that is the subject of an advertisement of the campaign. As a further example, a consumer may be carrying a balance on a credit card of another financial institution other than the financial institution that is running the marketing and advertising campaign. In some embodiments, the indirectly related credit record activity may be analyzed if the credit record activity is within a certain time period after the impression was served.

Information related to the credit record activity can be retrieved by the campaign measurement system 102 from the credit record. The credit record activity information may include identifying information of the consumer, date of the credit record activity, entity the consumer is requesting credit from, and/or other information related to the credit record activity. In some embodiments, the campaign measurement system 102 can depersonalize the credit record activity information and generate depersonalized credit record activity information that does not include identifying information of the consumer. The depersonalized credit record activity information may be organized by demographics, geography (e.g., ZIP+4), and/or other criteria.

Based on the credit record activity information and/or the depersonalized credit record activity information, the campaign measurement system 102 may generate a campaign report. The campaign report may be used to adjust, improve, and optimize a marketing and advertising campaign that is in progress or future campaigns. In some embodiments, the campaign report generated by the campaign measurement system 102 is an in-flight campaign report that is used when the marketing and advertising campaign is open and in progress. An in-flight campaign report may be transmitted from the campaign measurement system 102 to a media partner 154 that executes and optimizes marketing and advertising campaigns. The media partner 154 may execute and optimize the marketing and advertising campaigns on behalf of an advertiser 156 that is marketing products and services to consumers. In some embodiments, the in-flight campaign report may be transmitted from the campaign measurement system 102 to other entities, such as the advertiser 156. The media partner 154 and/or the advertiser 156 may utilize the in-flight campaign report to adjust, improve, and optimize the marketing and advertising campaign while the campaign is in progress. Such optimizations may include changes to the offers, pricing, product offerings, placement of advertisements, and/or other adjustments. The in-flight campaign reports may be generated periodically by the campaign measurement system 102 while the marketing and advertising campaign is in progress.

In other embodiments, the campaign report generated by the campaign measurement system 102 is a post-campaign report that is used after the marketing and advertising campaign is complete. The post-campaign report may be transmitted from the campaign measurement system 102 to the media partner 154, the advertiser 156, and/or other entities. The media partner 154 and/or the advertiser 156 may utilize the post-campaign report to adjust, improve, and optimize future marketing and advertising campaign. Such optimizations may include changes to the offers, pricing, product offerings, placement of advertisements, and/or other adjustments to future campaigns. The post-campaign reports may be generated periodically by the campaign measurement system 102 after the marketing and advertising campaign is complete.

The credit record activity used for the post-campaign report can be retrieved from the credit records of the consumers, following the completion of the marketing and advertising campaign. The credit records may be identified by matched identifiers that had been previously stored, for example, in an embodiment. In another embodiment, the credit records may also be identified based on a list of identifiers received by the campaign measurement system 102 from the media partner 154 and/or the advertiser 156. The list of identifiers may correspond to consumers who have been served an impression and/or consumers who clicked on an advertisement. The list of identifiers may also include activity related to the impression, such as the date and time the impression was served or the date and time the advertisement was clicked on. In some embodiments, credit records for the in-flight campaign report can be identified based on a list of identifiers from the media partner 154 and/or the advertiser 156, as described above.

The credit record activity used as the basis of the campaign reports may be complete, as in situations where all the credit record activity is in one credit bureau or credit reporting agency, or may be incomplete, as in situations where the credit record activity is in multiple credit bureaus or credit reporting agencies. Incomplete credit record activity may exist, for example, when a credit bureau or credit reporting agency is not the primary one used by a financial institution. The campaign measurement system 102 can generate the campaign reports based on complete or incomplete credit record activity. In particular, in the case where the campaign measurement system 102 has incomplete credit record activity of a consumer, the campaign reports can be generated based on extrapolations from this incomplete credit record activity. As such, the effectiveness of marketing and advertising campaigns can still be measured even if complete credit record activity is not available.

Figure 5:
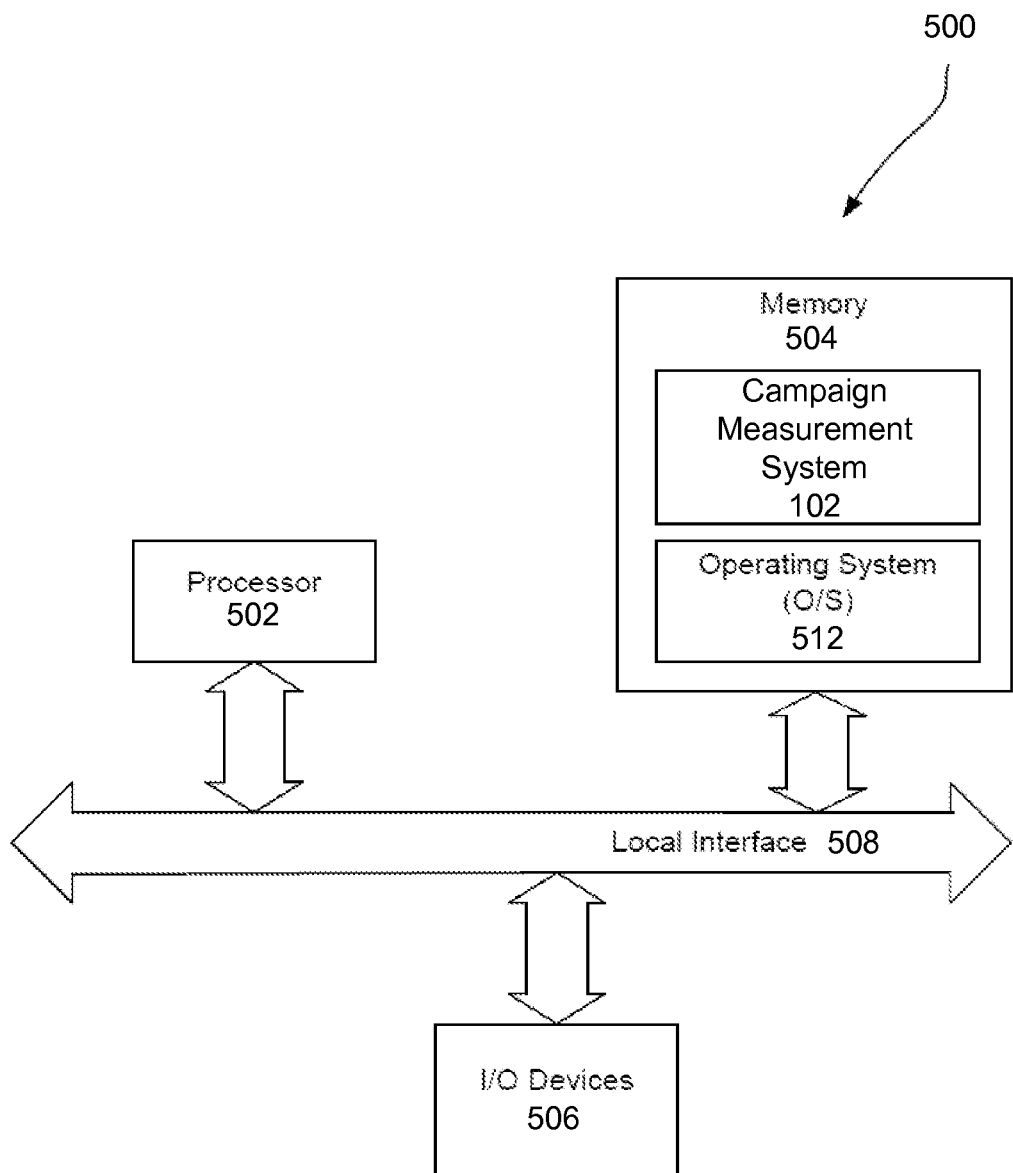
FIG. 5 is a block diagram of one form of a computer or server having a memory element with a computer readable medium for implementing the campaign measurement system of FIG. 1.

It should be noted that the data mart 152, the media partner 154, and the advertiser 156 may be in communication with respective databases 153, 155, and 157. The databases 153, 155, and 157 may store data and information related to the marketing and advertising campaigns, targeted consumers, and/or other data and information. Various components included in the environment 100 may be implemented using software executable by one or more servers or computers, such as a computing device with a processor 502 and memory 504 as shown in FIG. 5, which is described in more detail below.

Figure 2:
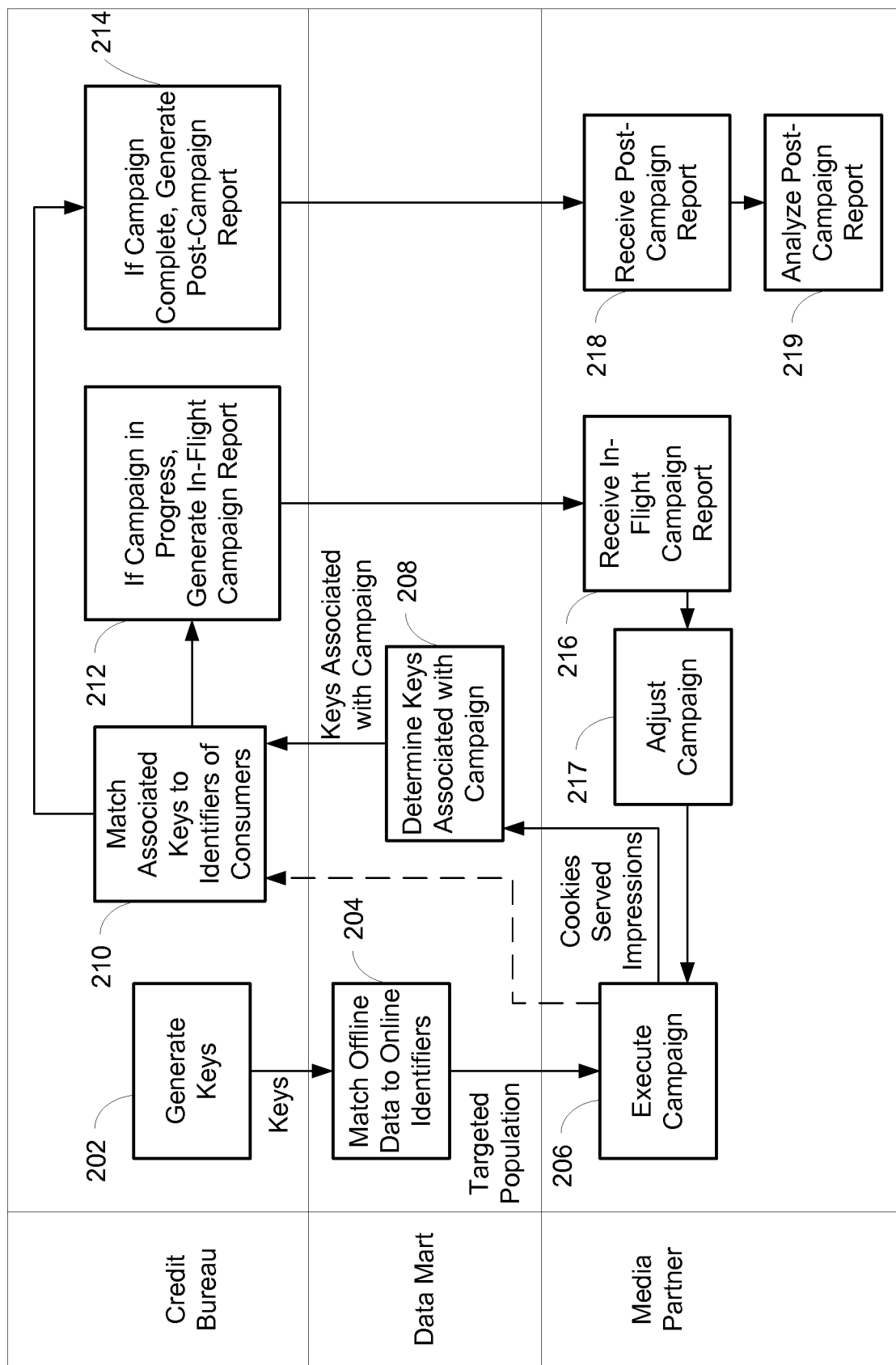
FIG. 2 is a flowchart illustrating an exemplary embodiment for measuring the effectiveness of a marketing and advertising campaign.

As an example of the usage of the campaign measurement system 102 in the environment 100, FIG. 2 illustrates an exemplary flowchart for measuring the effectiveness of a marketing and advertising campaign. A financial institution may run a marketing and advertising campaign with advertisements offering a credit card from the financial institution. Advertisements of the marketing and advertising campaign may be served to targeted consumers who have corresponding keys that have been previously generated by a credit bureau or credit reporting agency, such as by a matching system, for example, as indicated by box 202. The keys may be passed to a data mart where offline data is matched to online identifiers based on the keys, as indicated by box 204. The online identifiers may include, for example, cookies, device identifiers, publisher data, pixel tags, anonymous identifiers for advertising, and/or other types of identifiers. A population of targeted consumers may be passed from the data mart to the media partner. In some embodiments, the population may be segmented by demographics, geography, and/or other criteria. The marketing and advertising campaign may subsequently be executed by a media partner, as indicated by box 206, so that the consumers are served impressions of the advertisements of the marketing and advertising campaign.

In one embodiment, when a targeted consumer has been served an impression of an advertisement, the media partner may report the online identifiers, e.g., cookies, that have been served impressions to the data mart. The data mart may determine the keys associated with the campaign, as indicated by box 208. They keys associated with the campaign may include the keys that were served impressions, based on the online identifiers received from the media partner, and/or keys not served impressions. In some embodiments, the media partner pixels cookies (e.g., fires a pixel to identify which cookie has received impressions and identifies the cookies), and reports the impressions from the pixel process so that they keys can be determined by the data mart. In another embodiment, when a targeted consumer has been served an impression of an advertisement, the media partner may report the keys that have been served impressions to the campaign measurement system at the credit bureau or credit reporting agency.

The campaign measurement system may match the keys from the data mart and/or the media partner to identifiers of the corresponding consumers, as indicated by box 210. The identifiers may uniquely identify the credit records of the corresponding consumers in the credit data database. If the marketing and advertising campaign is in progress, the credit record activity in the credit record of the consumer (as looked up by the identifier) can be used to generate an in-flight campaign report, as indicated by box 212. The credit record activity may be that the consumer applied for the credit card that was the subject of the advertisement, and that the consumer applied for the credit card over the phone. The credit record activity may have been depersonalized prior to generating the in-flight campaign report. The in-flight campaign report may be received by the media partner, as indicated by box 216, so that the media partner and/or the financial institution can adjust, improve, and optimize the marketing and advertising campaign while it is in progress, as indicated by box 217. The adjusted campaign can then be executed, as indicated by box 206.

If the marketing and advertising campaign is complete, the credit record activity in the credit record of the consumer can be used to generate a post-campaign report, as indicated by box 214. The post-campaign report may be based on credit record activity that is retrieved after the campaign is complete. The credit record activity may be that the consumer is carrying a balance on the credit card, which indicates that the consumer activated the credit card. The credit record activity may have been depersonalized prior to generating the post-campaign report. The post-campaign report may be received by the media partner, as indicated by box 218, so that the media partner and/or the financial institution can analyze the post-campaign report to adjust, improve, and optimize future marketing and advertising campaigns, as indicated by box 219.

Figure 3:
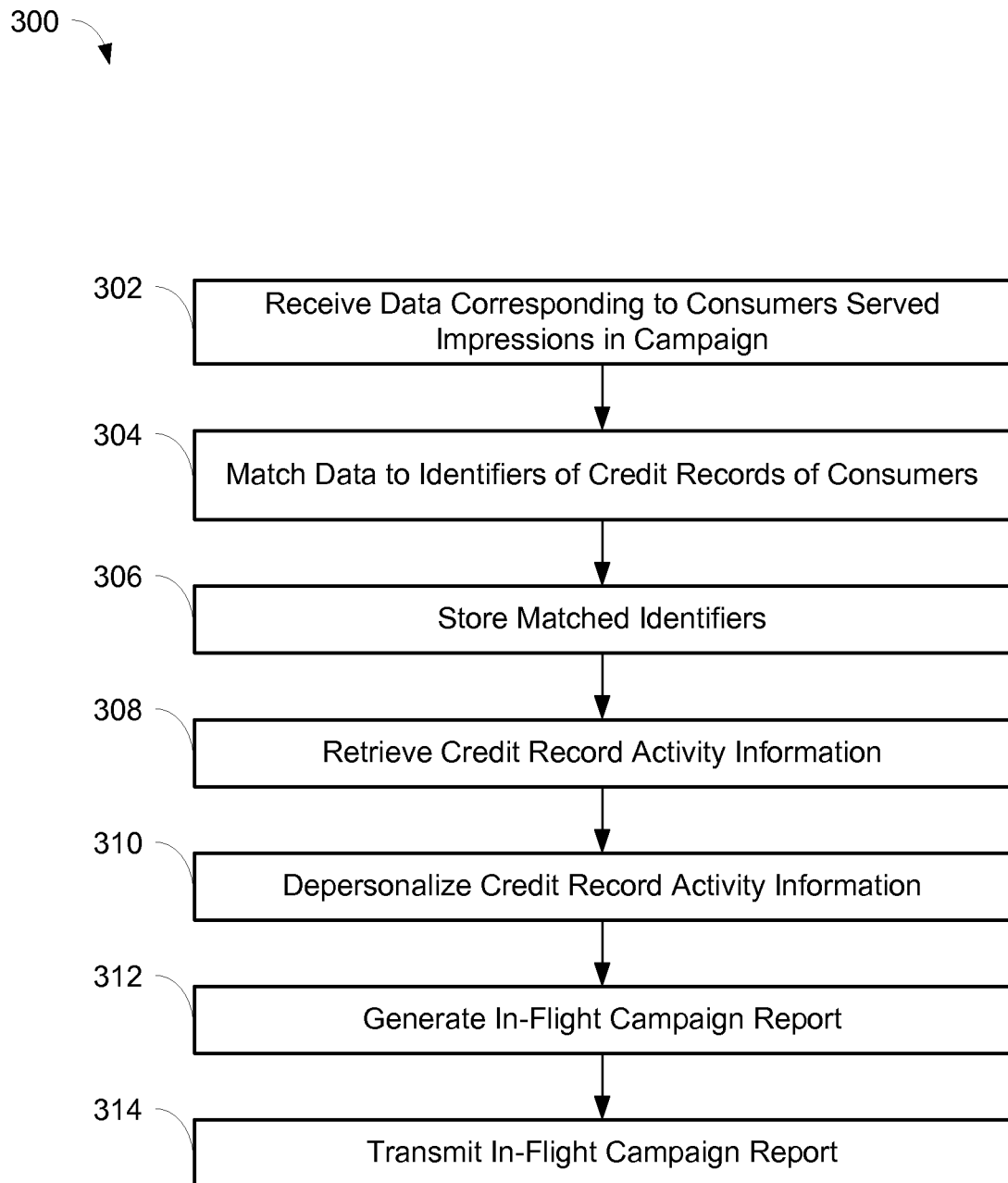
FIG. 3 is a flowchart illustrating operations for measuring the effectiveness of a marketing and advertising campaign while the campaign is active.

An embodiment of a process 300 for measuring the effectiveness of a marketing and advertising campaign while the campaign is active is shown in FIG. 3, in accordance with one or more principles of the invention. The process 300 may result in the generation and transmission of an in-flight campaign report. The in-flight campaign report may be utilized by a media partner and/or advertiser, for example, to adjust, improve, and optimize the marketing and advertising campaign while the campaign is in progress. The campaign measurement system 102 may perform all or part of the process 300, and the process 300 can utilize the credit data database 104 and/or the key database 106.

At step 302, data corresponding to consumers associated with the campaign, such as consumers that were served impressions of advertisements in the campaign, may be received. The data may be matched to identifiers of credit records of these consumers. The data may include keys that were originally assigned and created by a matching system that has compared and matched offline data and online data with credit-related data to identify matching targeted individuals, for example. The data received at step 302 can be matched to identifiers that uniquely identify a credit record of the consumer in the credit data database, at step 304. The matched identifiers can be stored at step 306 for later usage after the marketing and advertising campaign is completed, as described with reference to FIG. 4.

At step 308, information related to the credit record activity can be retrieved from the credit record. The credit record activity may be directly or indirectly related to the product or service being marketed in the marketing and advertising campaign. The credit record activity information may include identifying information of the consumer, date of the credit record activity, amount of the credit record activity, entity the consumer is requesting credit from, and/or other information related to the credit record activity. The credit record activity information can be optionally depersonalized at step 310 to create depersonalized credit record activity information that does not include identifying information of the consumers. At step 312, an in-flight campaign report may be generated, and the in-flight campaign report may be transmitted at step 314. The in-flight campaign report may be transmitted to a media partner and/or advertiser for adjusting, improving, and optimizing the marketing and advertising campaign while the campaign is in progress, for example. The in-flight campaign report may be based on the credit record activity information and/or the depersonalized credit record activity information.

Figure 4:
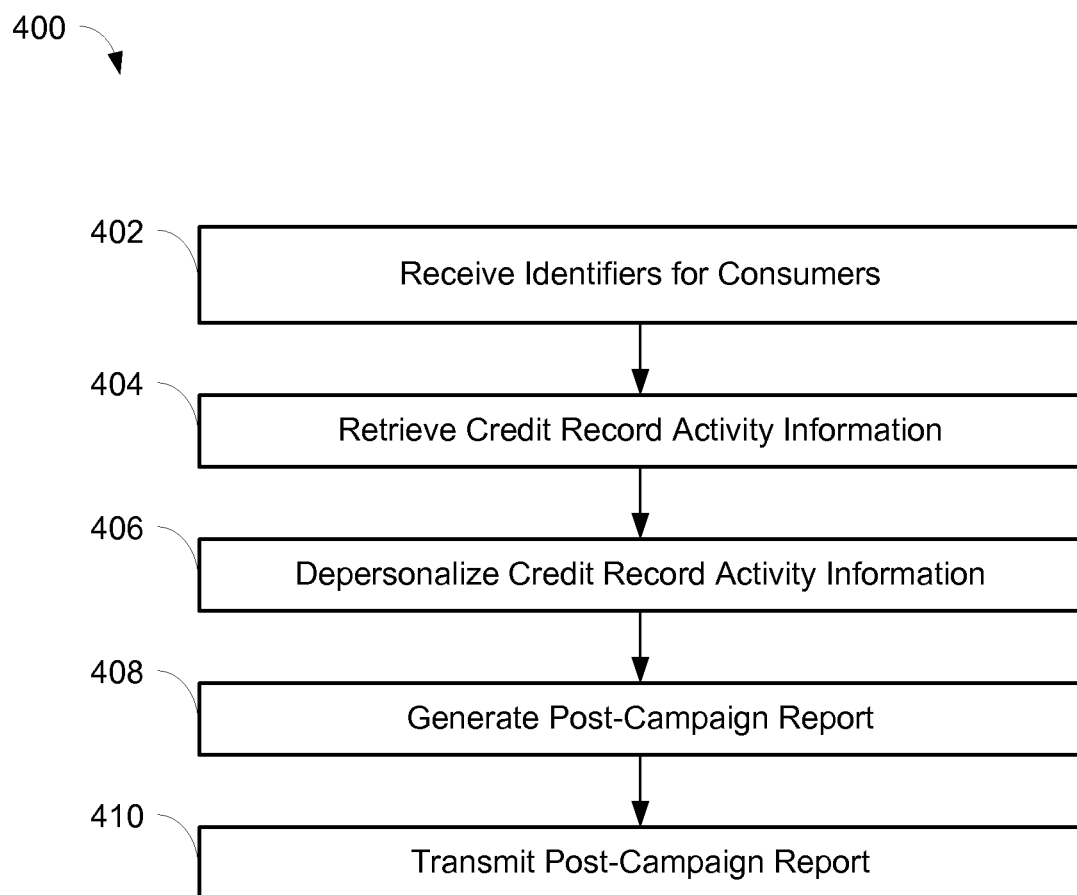
FIG. 4 is a flowchart illustrating operations for measuring the effectiveness of a marketing and advertising campaign when the campaign is complete.

An embodiment of a process 400 for measuring the effectiveness of a marketing and advertising campaign when the campaign is complete is shown in FIG. 4, in accordance with one or more principles of the invention. The process 400 may result in the generation and transmission of a post-campaign report. The post-campaign report may be utilized by a media partner and/or advertiser, for example, to adjust, improve, and optimize future marketing and advertising campaigns. The campaign measurement system 102 may perform all or part of the process 400, and the process 400 can utilize the credit data database 104 and/or the key database 106.

At step 402, identifiers corresponding to consumers may be received. The identifiers can be used to then retrieve the credit records of the corresponding consumers in the credit data database. The received identifiers may have been matched to keys (and consumers) served impressions in the marketing and advertising campaign, and/or may be matched to keys (and consumers) who clicked on an advertisement of the campaign. At step 404, information related to the credit record activity can be retrieved from the credit record. The credit record activity may include identifying information of the consumer, start date of the credit record activity, credit limit of the credit record activity, entity the consumer is requesting credit from, and/or other information related to the credit record activity.

The credit record activity information can be optionally depersonalized at step 406 to create depersonalized credit record activity information that does not include identifying information of the consumers. At step 408, a post-campaign report may be generated, and the post-campaign report may be transmitted at step 410. The post-campaign report may be transmitted to a media partner and/or advertiser for adjusting, improving, and optimizing future marketing and advertising campaigns. The post-campaign report may be based on the credit record activity information and/or the depersonalized credit record activity information.

FIG. 5 is a block diagram of a computing device 500 housing executable software used to facilitate the campaign measurement system 102. One or more instances of the computing device 500 may be utilized to implement any, some, or all of the components in the system 102. Computing device 500 includes a memory element 504. Memory element 504 may include a computer readable medium for implementing the system 102, and for implementing particular system transactions. Memory element 504 may also be utilized to implement the credit data database 104 and the key database 106. Computing device 500 also contains executable software, some of which may or may not be unique to the system 102.

In some embodiments, the system 102 is implemented in software, as an executable program, and is executed by one or more special or general purpose digital computer(s), such as a mainframe computer, a personal computer (desktop, laptop or otherwise), personal digital assistant, or other handheld computing device. Therefore, computing device 500 may be representative of any computer in which the system 102 resides or partially resides.

Generally, in terms of hardware architecture as shown in FIG. 5, computing device 500 includes a processor 502, a memory 504, and one or more input and/or output (I/O) devices 506 (or peripherals) that are communicatively coupled via a local interface 508. Local interface 508 may be one or more buses or other wired or wireless connections, as is known in the art. Local interface 508 may have additional elements, which are omitted for simplicity, such as controllers, buffers (caches), drivers, transmitters, and receivers to facilitate external communications with other like or dissimilar computing devices. Further, local interface 508 may include address, control, and/or data connections to enable internal communications among the other computer components.

Processor 502 is a hardware device for executing software, particularly software stored in memory 504. Processor 502 can be any custom made or commercially available processor, such as, for example, a Core series or vPro processor made by Intel Corporation, or a Phenom, Athlon or Sempron processor made by Advanced Micro Devices, Inc. In the case where computing device 500 is a server, the processor may be, for example, a Xeon or Itanium processor from Intel, or an Opteron-series processor from Advanced Micro Devices, Inc. Processor 502 may also represent multiple parallel or distributed processors working in unison.

Memory 504 can include any one or a combination of volatile memory elements (e.g., random access memory (RAM, such as DRAM, SRAM, SDRAM, etc.)) and non-volatile memory elements (e.g., ROM, hard drive, flash drive, CDROM, etc.). It may incorporate electronic, magnetic, optical, and/or other types of storage media. Memory 504 can have a distributed architecture where various components are situated remote from one another, but are still accessed by processor 502. These other components may reside on devices located elsewhere on a network or in a cloud arrangement.

The software in memory 504 may include one or more separate programs. The separate programs comprise ordered listings of executable instructions for implementing logical functions. In the example of FIG. 5, the software in memory 504 may include the system 102 in accordance with the invention, and a suitable operating system (O/S) 512. Examples of suitable commercially available operating systems 512 are Windows operating systems available from Microsoft Corporation, Mac OS X available from Apple Computer, Inc., a Unix operating system from AT&T, or a Unix-derivative such as BSD or Linux. The operating system O/S 512 will depend on the type of computing device 500. For example, if the computing device 500 is a PDA or handheld computer, the operating system 512 may be iOS for operating certain devices from Apple Computer, Inc., PalmOS for devices from Palm Computing, Inc., Windows Phone 8 from Microsoft Corporation, Android from Google, Inc., or Symbian from Nokia Corporation. Operating system 512 essentially controls the execution of other computer programs, such as the system 102, and provides scheduling, input-output control, file and data management, memory management, and communication control and related services.

If computing device 500 is an IBM PC compatible computer or the like, the software in memory 504 may further include a basic input output system (BIOS). The BIOS is a set of essential software routines that initialize and test hardware at startup, start operating system 512, and support the transfer of data among the hardware devices. The BIOS is stored in ROM so that the BIOS can be executed when computing device 500 is activated.

Steps and/or elements, and/or portions thereof of the invention may be implemented using a source program, executable program (object code), script, or any other entity comprising a set of instructions to be performed. Furthermore, the software embodying the invention can be written as (a) an object oriented programming language, which has classes of data and methods, or (b) a procedural programming language, which has routines, subroutines, and/or functions, for example but not limited to, C, C++, C#, Pascal, Basic, Fortran, Cobol, Perl, Java, Ada, Python, and Lua. Components of the system 102 may also be written in a proprietary language developed to interact with these known languages.

I/O device 506 may include input devices such as a keyboard, a mouse, a scanner, a microphone, a touch screen, a bar code reader, or an infra-red reader. It may also include output devices such as a printer, a video display, an audio speaker or headphone port or a projector. I/O device 506 may also comprise devices that communicate with inputs or outputs, such as a short-range transceiver (RFID, Bluetooth, etc.), a telephonic interface, a cellular communication port, a router, or other types of network communication equipment. I/O device 506 may be internal to computing device 500, or may be external and connected wirelessly or via connection cable, such as through a universal serial bus port.

When computing device 500 is in operation, processor 502 is configured to execute software stored within memory 504, to communicate data to and from memory 504, and to generally control operations of computing device 500 pursuant to the software. The system 102 and operating system 512, in whole or in part, may be read by processor 502, buffered within processor 502, and then executed.

In the context of this document, a "computer-readable medium" may be any means that can store, communicate, propagate, or transport data objects for use by or in connection with the system 102. The computer readable medium may be for example, an electronic, magnetic, optical, electromagnetic, infrared, or semiconductor system, apparatus, device, propagation medium, or any other device with similar functionality. More specific examples (a non-exhaustive list) of the computer-readable medium would include the following: an electrical connection (electronic) having one or more wires, a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via, for instance, optical scanning of the paper or other medium, then compiled, interpreted or otherwise processed in a suitable manner if necessary, and stored in a computer memory. The system 102 can be embodied in any type of computer-readable medium for use by or in connection with an instruction execution system or apparatus, such as a computer.

For purposes of connecting to other computing devices, computing device 500 is equipped with network communication equipment and circuitry. In a preferred embodiment, the network communication equipment includes a network card such as an Ethernet card, or a wireless connection card. In a preferred network environment, each of the plurality of computing devices 500 on the network is configured to use the Internet protocol suite (TCP/IP) to communicate with one another. It will be understood, however, that a variety of network protocols could also be employed, such as IEEE 802.11 Wi-Fi, address resolution protocol ARP, spanning-tree protocol STP, or fiber-distributed data interface FDDI. It will also be understood that while a preferred embodiment of the invention is for each computing device 500 to have a broadband or wireless connection to the Internet (such as DSL, Cable, Wireless, T-1, T-3, OC3 or satellite, etc.), the principles of the invention are also practicable with a dialup connection through a standard modem or other connection means. Wireless network connections are also contemplated, such as wireless Ethernet, satellite, infrared, radio frequency, Bluetooth, near field communication, and cellular networks.

Any process descriptions or blocks in figures should be understood as representing modules, segments, or portions of code which include one or more executable instructions for implementing specific logical functions or steps in the process, and alternate implementations are included within the scope of the embodiments of the invention in which functions may be executed out of order from that shown or discussed, including substantially concurrently or in reverse order, depending on the functionality involved, as would be understood by those having ordinary skill in the art.

It should be emphasized that the above-described embodiments of the invention, particularly, any "preferred" embodiments, are possible examples of implementations, merely set forth for a clear understanding of the principles of the invention. Many variations and modifications may be made to the above-described embodiment(s) of the invention without substantially departing from the spirit and principles of the invention. All such modifications are intended to be included herein within the scope of this disclosure and the invention and protected by the following claims.

What is claimed is:

1. A method comprising:
   responsive to an impression comprising a display of a digital advertisement of a digital marketing and advertising campaign being served to a consumer, receiving data that is matchable to a credit record identifier of the consumer, wherein:
      the data comprises a key corresponding to the consumer served the impression, the digital marketing and advertising campaign is directed to an asset, and
      the displayed digital advertisement comprises a consumer selectable offer directed to the consumer served the impression;
   retrieving, from a credit record database and based on the credit record identifier of the consumer, credit record activity information from a credit record of the consumer served the impression, wherein:
      the credit record comprises data related to online activity associated with the consumer served the impression and data related to offline activity associated with the consumer served the impression,
      the offline activity associated with the consumer served the impression is related to the asset that the digital marketing and advertising campaign is directed to, and
      the credit record activity information is determined following the offline activity associated with the consumer served the impression; and
   determining, by a processor and based on the credit record activity information, a measurement of effectiveness of the digital marketing and advertising campaign.

2. The method of claim 1, further comprising causing a modification of the digital marketing and advertising campaign based on the credit record activity information.

3. The method of claim 1, further comprising generating, by the processor, a campaign report based on the credit record activity information, the campaign report comprising the determined measurement of the effectiveness of the digital marketing and advertising campaign.

4. The method of claim 3, further comprising causing, by the processor, a transmission of the generated campaign report after the digital marketing and advertising campaign is complete.

5. The method of claim 4, wherein the generated campaign report is transmitted to a media partner that executes the digital marketing and advertising campaign for an advertiser.

6. The method of claim 3, further comprising depersonalizing, by the processor, the credit record activity information to generate depersonalized credit record activity information, wherein the generated campaign report is based on the depersonalized credit record activity information.

7. The method of claim 1, further comprising matching the key to the credit record identifier and storing the credit record identifier in association with the matched key.

8. The method of claim 1, wherein the key is received from one of a data mart, a media partner, and an advertiser.

9. The method of claim 1, wherein the credit record activity information is indirectly related to the asset which the digital marketing and advertising campaign is directed to.

10. A method comprising:
    responsive to an impression comprising a display of a digital advertisement of a digital marketing and advertising campaign being served to a consumer, receiving data that is matchable to a credit record identifier of the consumer, wherein:
       the data comprises a key corresponding to the consumer served the impression, the digital marketing and advertising campaign is directed to an asset, and
       the displayed digital advertisement comprises a consumer selectable offer directed to the consumer served the impression;
    retrieving, from a credit record database and based on the credit record identifier of the consumer, credit record activity information from a credit record of the consumer served the impression, wherein:
       the credit record comprises data related to online activity associated with the consumer served the impression and data related to offline activity associated with the consumer served the impression,
       the offline activity associated with the consumer served the impression is related to the asset that the digital marketing and advertising campaign is directed to, and
       the credit record activity information is determined following the offline activity associated with the consumer served the impression;
    determining, by a processor and based on the credit record activity information, a measurement of effectiveness of the digital marketing and advertising campaign; and
    causing a modification of the digital marketing and advertising campaign based on the credit record activity information, wherein the modification of the digital marketing and advertising campaign occurs while the digital marketing and advertising campaign is in progress.

11. A system comprising:
    a processor; and
    a memory device that stores a plurality of instructions that, when executed by the processor, cause the processor to:
       responsive to an impression comprising a display of a digital advertisement of a digital marketing and advertising campaign being served to a consumer, receive data that is matchable to a credit record identifier of the consumer, wherein:
          the data comprises a key corresponding to the consumer served the impression,
          the digital marketing and advertising campaign is directed to an asset, and the displayed digital advertisement comprises a consumer selectable offer directed to the consumer served the impression;
       retrieve, from a credit record database and based on the credit record identifier of the consumer, credit record activity information from a credit record of the consumer served the impression, wherein:

the credit record comprises data related to online activity associated with the consumer served the impression and data related to offline activity associated with the consumer served the impression, the offline activity associated with the consumer served the impression is related to the asset that the digital marketing and advertising campaign is directed to, and the credit record activity information is determined following the offline activity associated with the consumer served the impression; and determine, based on the credit record activity information, a measurement of effectiveness of the digital marketing and advertising campaign.

12. The system of claim 11, wherein the memory device stores a plurality of further instructions that, when executed by the processor, cause the processor to cause a modification of the digital marketing and advertising campaign based on the credit record activity information.

13. The system of claim 12, wherein the modification of the digital marketing and advertising campaign occurs while the digital marketing and advertising campaign is in progress.

14. The system of claim 11, wherein the memory device stores a plurality of further instructions that, when executed by the processor, cause the processor to generate a campaign report based on the credit record activity information, the campaign report comprising the determined measurement of the effectiveness of the digital marketing and advertising campaign.

15. The system of claim 14, wherein the memory device stores a plurality of further instructions that, when executed by the processor, cause the processor to cause a transmission of the generated campaign report after the digital marketing and advertising campaign is complete.

16. The system of claim 15, wherein the generated campaign report is transmitted to a media partner that executes the digital marketing and advertising campaign for an advertiser.

17. The system of claim 14, wherein the memory device stores a plurality of further instructions that, when executed by the processor, cause the processor to depersonalize the credit record activity information to generate depersonalized credit record activity information, wherein the generated campaign report is based on the depersonalized credit record activity information.

18. The system of claim 11, wherein the memory device stores a plurality of further instructions that, when executed by the processor, cause the processor to match the key to the credit record identifier, and store the credit record identifier in association with the matched key.

19. The system of claim 11, wherein the key is received from one of a data mart, a media partner, and an advertiser.

20. The system of claim 11, wherein the credit record activity information is indirectly related to the asset which the digital marketing and advertising campaign is directed to.

* * * * *